(12) United States Patent
O'Leary et al.

(10) Patent No.: US 8,779,016 B2
(45) Date of Patent: Jul. 15, 2014

(54) SPRAY-IN LATEX FOAM FOR SEALING AND INSULATING

(75) Inventors: Robert J. O'Leary, Newark, OH (US); Michelle L. Korwin-Edson, Pataskala, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 569 days.

(21) Appl. No.: 11/647,747

(22) Filed: Dec. 29, 2006

(65) Prior Publication Data

US 2008/0160203 A1    Jul. 3, 2008

(51) Int. Cl.
*C08J 9/30* (2006.01)
*C08J 9/12* (2006.01)

(52) U.S. Cl.
CPC ............... *C08J 9/12* (2013.01); *C08J 2321/00* (2013.01)
USPC ................... 521/65; 521/71; 521/72; 521/64; 521/78; 521/100

(58) Field of Classification Search
USPC ............................. 521/65, 71, 72, 64, 78, 100
See application file for complete search history.

(56) References Cited

U.S. PATENT DOCUMENTS

| | | | |
|---|---|---|---|
| 3,577,554 A | 5/1971 | Parrish | |
| 3,617,198 A | 11/1971 | Reid et al. | |
| 3,673,133 A | 6/1972 | Schmidt | |
| 3,714,078 A | 1/1973 | Gordon et al. | |
| 3,768,969 A | 10/1973 | Kullman et al. | |
| 3,913,298 A | 10/1975 | Cogliano | |
| 3,984,360 A | 10/1976 | Galbreath et al. | |
| 3,992,558 A * | 11/1976 | Smith-Johannsen et al. | 427/213 |
| 4,041,667 A | 8/1977 | Lindner et al. | |
| 4,119,583 A | 10/1978 | Filip et al. | |
| 4,203,815 A | 5/1980 | Noda et al. | |
| 4,205,103 A | 5/1980 | Davis et al. | |
| 4,244,901 A | 1/1981 | Wencley et al. | |
| 4,263,362 A | 4/1981 | Straka | |
| 4,306,548 A | 12/1981 | Cogliano | |
| 4,328,319 A | 5/1982 | Osipow et al. | |
| 4,350,774 A * | 9/1982 | Scotti et al. | 521/95 |
| 4,408,018 A | 10/1983 | Bartman et al. | |
| 4,430,832 A | 2/1984 | Kaiser et al. | |
| 4,460,711 A | 7/1984 | Jacobson | |
| 4,490,505 A | 12/1984 | Pendergrass, Jr. | |
| 4,644,014 A | 2/1987 | Thomson et al. | |
| 4,692,473 A | 9/1987 | Wright et al. | |
| 4,694,025 A | 9/1987 | Park | |
| 4,737,525 A | 4/1988 | Blount | |
| 4,759,956 A * | 7/1988 | Amer et al. | 427/213 |
| 4,762,866 A | 8/1988 | Shih et al. | |
| 4,773,562 A | 9/1988 | Gueret | |
| 4,857,566 A | 8/1989 | Helbling | |
| 4,900,762 A | 2/1990 | Broemmelsiek et al. | |
| 4,904,702 A | 2/1990 | Allen | |
| 4,945,120 A | 7/1990 | Kopp et al. | |
| 4,977,219 A | 12/1990 | Watson, Jr. | |
| 4,990,541 A | 2/1991 | Nielsen et al. | |
| 5,062,878 A | 11/1991 | Tobiason | |
| 5,096,616 A | 3/1992 | Kittie | |
| 5,114,484 A | 5/1992 | Lynch | |
| 5,127,552 A | 7/1992 | Bauman et al. | |
| 5,165,915 A * | 11/1992 | Tokubo et al. | 424/63 |
| 5,217,665 A | 6/1993 | Lim et al. | |
| 5,218,793 A | 6/1993 | Ball | |
| 5,256,400 A * | 10/1993 | Froix et al. | 424/45 |
| 5,314,942 A | 5/1994 | Coogan et al. | |
| 5,359,816 A | 11/1994 | Iacouides | |
| 5,389,167 A | 2/1995 | Sperber | |
| 5,398,471 A | 3/1995 | Spagnolo | |
| 5,403,414 A | 4/1995 | Corston | |
| 5,403,884 A | 4/1995 | Perlinski | |
| 5,444,099 A | 8/1995 | Abe et al. | |
| 5,505,344 A * | 4/1996 | Woods | 222/394 |
| 5,585,412 A | 12/1996 | Natoli et al. | |
| 5,611,962 A | 3/1997 | Garcia et al. | |
| 5,741,823 A | 4/1998 | Hsu | |
| 5,786,398 A | 7/1998 | Hulls et al. | |

(Continued)

FOREIGN PATENT DOCUMENTS

| | | |
|---|---|---|
| CN | 1245815 A | 3/2000 |
| EP | 1 593 727 A1 | 11/2005 |
| EP | 1 640 388 A2 | 3/2006 |
| WO | 99/042517 | 8/1999 |
| WO | 0105886 | 1/2001 |
| WO | WO 01/05886 | 1/2001 |
| WO | WO 01/09239 | 2/2001 |
| WO | 01/032227 | 5/2001 |
| WO | 0155266 | 8/2001 |
| WO | WO 01/55266 | 8/2001 |

(Continued)

OTHER PUBLICATIONS

International Search Report dated May 2, 2008 in PCT/US2007/026433.

(Continued)

*Primary Examiner* — Irina S Zemel
(74) *Attorney, Agent, or Firm* — Calfee, Halter & Griswold LLP (57) ABSTRACT

A spray latex foam for filling wall cavities to enhance the sealing and insulating properties of a building is provided. The spray latex foam includes a latex system and a gaseous coagulating component. In at least one exemplary embodiment, carbon dioxide is included as a gaseous coagulating agent. One latex suitable for use in the spray foam is polyvinylidene chloride (PVDC), which possesses fire retardancy and environmental durability. However, a preferred latex is styrene-butadiene rubber (SBR). The latex system may also include a thixotropic agent, such as Laponite® RD synthetic clay. The spray latex foam is polyurethane-free. A method of preparing a spray latex foam that includes supplying a latex system and adding a gaseous coagulating component to the latex system is also provided.

18 Claims, 5 Drawing Sheets

(56) References Cited

U.S. PATENT DOCUMENTS

| | | |
|---|---|---|
| 5,883,182 A | 3/1999 | Hunt |
| 5,945,461 A | 8/1999 | Gosiewski et al. |
| 6,071,580 A | 6/2000 | Bland et al. |
| 6,125,608 A | 10/2000 | Charlson |
| 6,194,479 B1 | 2/2001 | Tabakovic |
| 6,221,464 B1 | 4/2001 | Patel et al. |
| 6,284,077 B1 | 9/2001 | Lucas et al. |
| 6,291,536 B1 | 9/2001 | Taylor |
| 6,296,795 B1 | 10/2001 | Buck |
| 6,298,619 B1 | 10/2001 | Davie |
| 6,414,044 B2 | 7/2002 | Taylor |
| 6,451,876 B1 | 9/2002 | Koshy |
| 6,578,332 B2 | 6/2003 | Bushberger |
| 6,753,355 B2 | 6/2004 | Stollmaier et al. |
| 6,787,579 B2 | 9/2004 | Czaplicki et al. |
| 6,797,736 B1 | 9/2004 | Smiecinski et al. |
| 6,948,287 B2 | 9/2005 | Kornl |
| 7,005,457 B2 | 2/2006 | Loh et al. |
| 7,053,131 B2 | 5/2006 | Ko et al. |
| 2002/0161063 A1 | 10/2002 | Duffy et al. |
| 2003/0060523 A1 | 3/2003 | Czaplicki |
| 2003/0118822 A1 | 6/2003 | Jahns et al. |
| 2003/0195266 A1 | 10/2003 | mork et al. |
| 2003/0229153 A1 | 12/2003 | Stollmaier et al. |
| 2004/0148889 A1 | 8/2004 | Bibee et al. |
| 2004/0225051 A1 | 11/2004 | Moy |
| 2005/0027025 A1 | 2/2005 | Erb et al. |
| 2005/0043423 A1 | 2/2005 | Schmidt et al. |
| 2005/0079352 A1 | 4/2005 | Glorioso et al. |
| 2005/0081994 A1 | 4/2005 | Beckley |
| 2005/0188649 A1 | 9/2005 | Hagen, Jr. |
| 2006/0047010 A1 | 3/2006 | O'Leary |
| 2006/0083762 A1 | 4/2006 | Brun et al. |
| 2006/0128821 A1 | 6/2006 | Owens et al. |
| 2006/0135635 A1 | 6/2006 | deVry |
| 2006/0219350 A1 | 10/2006 | Bain et al. |
| 2006/0272280 A1 | 12/2006 | Romes et al. |
| 2007/0234649 A1 | 10/2007 | Near et al. |
| 2007/0290074 A9 | 12/2007 | Dansizen et al. |
| 2008/0160203 A1 | 7/2008 | O'Leary et al. |
| 2008/0161430 A1 | 7/2008 | Korwin-Edson et al. |
| 2008/0161431 A1 | 7/2008 | Korwin-Edson et al. |
| 2008/0161432 A1 | 7/2008 | Korwin-Edson et al. |
| 2008/0161433 A1 | 7/2008 | Korwin-Edson et al. |
| 2008/0281006 A1 | 11/2008 | O'Leary et al. |
| 2009/0111902 A1 | 4/2009 | Korwin-Edson et al. |
| 2010/0175810 A1 | 7/2010 | Korwin-Edson et al. |
| 2010/0189908 A1 | 7/2010 | Olang et al. |
| 2011/0123717 A1 | 5/2011 | O'Leary et al. |
| 2011/0224317 A1 | 9/2011 | O'Leary et al. |

FOREIGN PATENT DOCUMENTS

| | | |
|---|---|---|
| WO | WO 02/26873 | 4/2002 |
| WO | 02068515 | 9/2002 |
| WO | WO 02/068515 | 9/2002 |
| WO | 2005/023918 | 3/2005 |
| WO | 2006/107342 | 10/2006 |
| WO | WO 2006/107342 | 10/2006 |
| WO | WO 2007/060462 | 5/2007 |
| WO | WO 2007/091961 | 8/2007 |
| WO | 2007112799 | 10/2007 |
| WO | WO 2007/112799 | 10/2007 |
| WO | 2008/005022 | 1/2008 |
| WO | 2008/082618 | 7/2008 |
| WO | 2008/082619 | 7/2008 |
| WO | 2008/082620 | 7/2008 |
| WO | 2010/083482 | 7/2010 |
| WO | 2010/083483 | 7/2010 |

OTHER PUBLICATIONS

International Search Report dated Apr. 14, 2008 in PCT/US2007/026434.
International Search Report dated Apr. 14, 2008 in PCT/US2007/026435,.
EP Communication dated Apr. 28, 2010, Application No. 0786810935-2102.
EP Communication dated Nov. 11, 2009, Application No. 07868109.5-2102.
Response to EPO dated Mar. 22, 2010, Application No. 0786810935.
International Preliminary Report on Patentability, PCT/US2007/026433.
International Search Report, PCT/US2007/026433 completed Apr. 18, 20008, dated May 2, 2008.
Reply to PCT Written Opinion, International Application No. PCT/US2007/026433, dated Oct. 14, 2008.
Notification of First Office Action, Chinese, Application No. 200780048857.9, dated Jul. 15, 2011.
Translation of Notification of First Office Action, Chinese, Application No. 200780048857.9, dated Jul. 15, 2011.
Office action from U.S. Appl. No. 11/893,435 dated Sep. 6, 2013.
Office action from U.S. Appl. No. 11/893,474 dated Sep. 6, 2013.
XAMA-7 flyer, 2004, version 1, Nov. 16, 2004—2 pgs.
Office action from Canadian Application No. 2,709,801 dated Sep. 5, 2013.
Office action from Chinese Application No. 201080008427.6 dated Dec. 4, 2012.
Office action from U.S. Appl. No. 12/688,947 dated May 24, 2013.
International Search Report and Written Opinion from PCT/US10/021305 dated Mar. 9, 2010.
International Search Report and Written Opinion from PCT/US10/021312 dated Mar. 9, 2010.
Office action from U.S. Appl. No. 11/893,435 dated Mar. 11, 2010.
Office action from U.S. Appl. No. 11/893,435 dated Sep. 17, 2010.
Office action from U.S. Appl. No. 11/893,435 dated Jun. 14, 2011.
Office action from U.S. Appl. No. 11/893,435 dated Nov. 1, 2011.
Advisory action from U.S. Appl. No. 11/893,435 dated Feb. 8, 2012.
Office action from U.S. Appl. No. 11/893,436 dated Mar. 11, 2010.
Office action from U.S. Appl. No. 11/893,436 dated Sep. 20, 2010.
Office action from U.S. Appl. No. 11/893,436 dated Jun. 14, 2011.
Office action from U.S. Appl. No. 11/893,436 dated Jan. 9, 2012.
Office action from U.S. Appl. No. 11/893,474 dated Mar. 11, 2010.
Office action from U.S. Appl. No. 11/893,474 dated Sep. 16, 2010.
Office action from U.S. Appl. No. 11/893,474 dated Jun. 15, 2011.
Office action from U.S. Appl. No. 11/893,474 dated Nov. 1, 2011.
Advisory action from U.S. Appl. No. 11/893,474 dated Feb. 8, 2012.
Office action from U.S. Appl. No. 11/893,451 dated Mar. 11, 2010.
Office action from U.S. Appl. No. 11/893,451 dated Sep. 16, 2010.
Office action from U.S. Appl. No. 11/893,451 dated Jun. 14, 2011.
Office action from U.S. Appl. No. 11/893,451 dated Jan. 9, 2012.
Office action from U.S. Appl. No. 12/688,947 dated Jun. 19, 2012.
Office action from U.S. Appl. No. 12/688,951 dated May 9, 2012.
Office action from U.S. Appl. No. 11/977,849 dated Sep. 29, 2010.
Office action from U.S. Appl. No. 11/977,849 dated Mar. 4, 2011.
Office action from U.S. Appl. No. 11/977,849 dated Jul. 26, 2011.
Notice of Abandonment from U.S. Appl. No. 11/977,849 dated Aug. 21, 2012.
Examination Report from New Zealand Application No. 577,570 dated Sep. 16, 2010.
Examination Report from New Zealand Application No. 594,409 dated May 18, 2012.
Examination Report from New Zealand Application No. 594,418 dated May 18, 2012.
Benzoflex 2088 Plasticizer flyer, 2010.
Cardolite NC-514 Flexible Epoxy Resin, flyer, 2009.
XAMA-7 flyer, 2003.
Office action from U.S. Appl. No. 12/875,640 dated Sep. 17, 2012.
Office action from U.S. Appl. No. 12/875,640 dated Apr. 17, 2013.
Office action from U.S. Appl. No. 12/688,951 dated Nov. 15, 2012.
Office action from Chinese Application No. 20108008149.4 dated Oct. 18, 2012.

(56) References Cited

OTHER PUBLICATIONS

Office action from U.S. Appl. No. 12/688,947 dated Dec. 20, 2013.
Office action from U.S. Appl. No. 13/113,785 dated Jan. 22, 2014.
Office action and Interview Summary from U.S. Appl. No. 13/893,435 dated Mar. 21, 2014.
Office action and Interview Summary from U.S. Appl. No. 11/893,474 dated Mar. 18, 2014.
Interview Summary from U.S. Appl. No. 11/893,474 dated Dec. 9, 2013.
Interview Summary from U.S. Appl. No. 11/893,435 dated Dec. 9, 2013.

* cited by examiner

SPRAY-IN LATEX FOAM FOR SEALING AND INSULATING

TECHNICAL FIELD AND INDUSTRIAL APPLICABILITY OF THE INVENTION

The present invention relates generally to latex foams and, more particularly, to spray latex foams used to fill wall cavities to enhance the sealing and insulating properties of buildings. Methods of making a spray latex foam and methods of filling wall cavities using the spray latex foam are also provided.

BACKGROUND OF THE INVENTION

Spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Currently, spray foams, especially those used as insulators or sealants for home walls, are polyurethane spray foams.

Polyurethane spray foams and their methods of manufacture are well known. Typically, polyurethane spray foams are formed from two separate components, commonly referred to as an "A" side and a "B" side, that react when they come into contact with each other. The first component, or the "A" side, contains an isocyanate such as a di- or poly-isocyanate that has a high percent of NCO (nitrogen, carbon and oxygen) functional groups on the molecule. The second component, or "B" side, contains polyols that include two or more active hydrogens, silicone-based surfactants, blowing agents, catalysts, and/or other auxiliary agents. The active hydrogen-containing compounds are generally polyols, primary and secondary polyamines, and/or water. Preferably, mixtures of diols and triols are used to achieve the desired foaming properties. The overall polyol hydroxyl number is designed to achieve a 1:1 ratio of first component to second component (A:B).

The two components are typically delivered through separate lines into a spray gun such as an impingement-type spray gun. The first and second components are pumped through small orifices at high pressure to form separate streams of the individual components. The streams of the first and second components intersect and mix with each other within the gun and begin to react. The heat of the reaction causes the temperature of the reactants in the first and second components to increase. This rise in temperature causes the blowing agent located in the second component (the "B" side) to vaporize and form a foam mixture. As the mixture leaves the gun, the mixture contacts a surface, sticks to it, and continues to react until the isocyanate groups have completely reacted. The resulting resistance to heat transfer, or R-value, may be from 4 to 8 per inch.

There are several problems associated with conventional polyurethane spray foams. For example, although sealing a building with such polyurethane spray foams reduces drafts and keeps conditioned air inside and external air outside of a building, there is a reduction in the ability of moisture to penetrate the building. As a result, the levels of moisture and air pollutants rise in these tightly sealed buildings that no longer permit moisture penetration into the building.

Another problem associated with conventional polyurethane spray foams is that the first component (the "A" side) contains high levels of methylene-diphenyl-di-isocyanate (MDI) monomers. When the foam reactants are sprayed, the MDI monomers form droplets that may be inhaled by workers installing the foam if stringent safety precautions are not followed. Even a brief exposure to isocyanate monomers may cause difficulty in breathing, skin irritation, blistering and/or irritation to the nose, throat, and lungs. Extended exposure of these monomers can lead to a sensitization of the airways, which may result in an asthmatic-like reaction and possibly death.

An additional problem with such conventional polyurethane spray foams is that residual polymeric methylene-diphenyl-di-isocyanate (PMDI) that is not used is considered to be a hazardous waste. PMDI typically has an NCO of about 20%. In addition, PMDI can remain in a liquid state in the environment for years. Therefore, specific procedures must be followed to ensure that the PMDI waste product is properly and safely disposed of in a licensed land fill. Such precautions are both costly and time consuming.

Yet another problem with such conventional polyurethane spray foams is that the reaction of the isocyanate in the "A" side with the polyol in the "B" side is a "two-part" proportioning reaction, which requires complex equipment during the formation and application of the foam. Such foams are also problematic in that it often causes the equipment to clog, resulting in time consuming clean up. In particular, the impingement-type spray guns typically used work reasonably well with a 1:1 ratio of liquids that are about the same viscosity. However, higher ratio mixtures tend to cause plugging when the larger stream overwhelms the smaller stream, allowing the reaction of the components of the "A" and "B" side to occur within the orifice. Once this happens, the gun must be disassembled and cleaned, which involves special chemicals. In addition, disassembling the gun can cost the insulation contractor a great deal of down time because it may take hours to resolve a plugging problem.

Latex foam pillows and similar items have been produced using what is known in the art as the Talalay process. In particular, the Talalay process is a batch process in which slightly foamed latex is poured into a mold to partially fill it. In this process, volatile or gas-generating substances are compounded with the latex to generate foam. The additive may be either hydrogen peroxide or a low boiling solvent. The unfrothed latex is then put into a mold. The mold is closed, and the latex expanded by vacuum to completely fill the mold. After foaming, the latex is cooled to below the freezing point of water to retard the drainage and collapse tendencies of the foam. Carbon dioxide gas is passed through the foam. The temperature is then raised to 115° C. to achieve vulcanization. The pH of the system may decrease from about 11 to 9 during the carbon dioxide addition. In a more modern Talalay process today, the latex is mechanically foamed, while the rest of the process remains the same. According to this newer process, foam is produced with compressed air in a mold and carbon dioxide is introduced into the mold at a different time. Compressed air alone will not coagulate the latex. Moreover, the Talalay process is a batch process wherein latex is poured into molds and is not a spray foam.

U.S. Pat. No. 7,053,131 to Ko et al. discloses absorbent articles that include super critical fluid treated foams. In particular, super critical carbon dioxide is used to generate foams that assertedly have improved physical and interfacial properties.

U.S. Pat. No. 6,414,044 to Taylor teaches foamed caulk and sealant compositions that include a latex emulsion and a liquid gaseous propellant component. The foamed compositions do not contain a gaseous coagulating component.

U.S. Pat. No. 6,071,580 to Bland et al. discloses an absorbent, extruded thermoplastic foam made with blowing agents that include carbon dioxide. The foam is allegedly capable of absorbing liquid at about 50 percent or more of its theoretical volume capacity.

U.S. Pat. No. 5,741,823 to Hsu teaches producing a smooth, hard coating on a wood substrate. The coating is made of a foamed, polymerized latex emulsion and is applied on the surface of a wood substrate.

U.S. Pat. No. 5,585,412 to Natoli et al. discloses a process for preparing flexible CFC-free polyurethane foams that uses an encapsulated blowing agent. The process provides a polyurethane foam having a desired density that avoids the use of chlorofluorocarbons or other volatile organic blowing agents. The encapsulated blowing agent assertedly supplements the primary blowing action provided by water in the manufacture of water-blown polyurethane foam and facilitates in the production of foam having the desired density.

U.S. Pat. No. 4,306,548 to Cogliano discloses lightweight foamed porous casts. To manufacture the casts, expanded non-porous polystyrene foam beads or other shapes are coated with a layer of neoprene, natural rubber, or other latex. The coated polystyrene is then encased in a porous envelope, and the envelope is applied to a broken limb. Additional coated polystyrene is added over the envelope and a gaseous coagulant is added to gel the latex, which causes the polystyrene beads to adhere to each other and produce a unified, rigid structure.

Thus, there is an existing need in the art for a spray latex foam that is not only safe for workers and environmentally friendly but one that also allows for moisture penetration.

SUMMARY OF THE INVENTION

It is an object of the present invention to provide a spray latex foam for use in filling wall cavities to enhance the sealing and insulating properties of buildings. The spray latex foam of the present invention includes a latex system and a gaseous coagulating component. The latex system may also include a thixotropic agent.

It is another object of the present invention to provide a method of preparing a spray latex foam. The method of preparing the spray latex foam generally includes supplying a latex system and adding a gaseous coagulating component to the latex system to prepare a spray latex foam. The latex system includes a latex emulsion and may optionally include a thixotropic agent.

It is yet another object of the present invention to provide a method of filling wall cavities that includes spraying a spray latex foam into the cavities. The spray latex foam includes a latex system and a gaseous coagulating component. The latex system includes a latex emulsion and may further include a thixotropic agent.

One advantage of the inventive spray latex foam is that the foam does not contain the harmful chemicals found in conventional polyurethane spray foams, such as, for example, MDI monomers. As a result, the spray latex foam of the present invention does not contain harmful vapors that may cause skin or lung sensitization or generate toxic waste. Moreover, the spray latex foam does not emit harmful vapors into the air when the latex foam is sprayed, such as when filling wall cavities to seal and/or insulate a building's envelope. The inventive foam is safe for workers to install and can, therefore, be used in the house renovation market and in houses that are occupied. The lack of harmful chemicals in the spray latex foam also means that it can be safely disposed without having to follow any stringent hazardous waste disposal precautions.

Another advantage of the spray latex foam is that the foam may be applied using existing spray equipment designed for conventional two-part spray polyurethane foam systems without clogging the spray equipment. Thus, the application gun is capable of repeated use without clogging and the resulting necessary cleaning when the spray latex foam of the present invention is utilized.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

The present invention relates to a polyurethane-free spray latex foam for use in filling wall cavities of buildings to improve the sealing and insulation properties. The spray latex foam of the present invention includes a latex system and a gaseous coagulating component. In addition, the latex system may include a thixotropic agent. Unlike conventional spray polyurethane foams, the spray latex foam of the present invention does not contain isocyanate. Therefore, no MDI monomers are present in the inventive spray latex foam. Because the inventive spray latex foam does not contain isocyanate, no harmful chemicals are emitted during installation of the foam.

It is preferred that the spray latex foam of the present invention, as well as the components thereof, meet certain performance properties, or Fitness for Use ("FFU") criteria. In particular, the chemical property FFUs that the spray latex foam should meet include the following criteria:

- The foam should adhere to various materials such as wood, metal, concrete and plastic
- The chemical constituents should be as safe as possible. If a hazardous chemical is used, it should not be introduced or atomized into the air where it can be inhaled
- The foam may be chemically foamed through the use of a blowing agent or it may be mechanically foamed with a gas
- The installer of the spray latex foam should be able to work with the material without any specialized personal protective equipment ("PPE"), such as a breathing apparatus, although safety glasses, dust mask, and gloves are acceptable
- The foam should not lend itself to molding or fungus growth (ASTM C1338)

The foam should not contain a food source for insects or rodents

There should be a minimum shelf life of the unreacted constituents of 12 months.

It is also desirable that the spray latex foam of the present invention meet certain physical property FFUs. The physical property FFUs that the inventive spray latex foam should meet include the following:

The foam weight should be between about 0.5 and about 2.0 pounds per cubic foot

The foam should be fluid enough to be sprayed either at room temperature or by heating (viscosity of <10,000 cp at a high shear rate)

The foam should not sag or fall in the cavity

The foam should fill the entire cavity or be used to coat the cavity with an air barrier Ideally, the foam should be a closed-cell variety, but an open-cell variety is acceptable if the open-cell variety is necessary to achieve the other FFUs The foam should have a thermal resistance (R-value) of at least about 3.7° F. ft$^2$h/BTU per inch The foam should be non-sagging and non-dripping (i.e., fire retardant) during a fire The foam should not corrode metal objects such as screws, nails, electrical boxes, and the like Air infiltration should be negligible (ASTM E283-04) (spec 0.4 cfm/sq ft)

Water vapor infiltration should be greater then about 1 perm or about $5.72 \times 10^{-8}$ g/Pa-s-m$^2$ The foam should be red/pink in color The foam should have a low odor.

As discussed above, the spray latex foam of the present invention includes a latex system. Preferably, the latex system is an aqueous latex emulsion. The latex emulsion includes latex particles that are typically produced by emulsion polymerization. In addition to the latex particles, the latex emulsion may include water, a stabilizer such as ammonia, and a surfactant.

There are numerous types of latex that may be used in the latex emulsion. Non-limiting examples of suitable latexes include natural and synthetic rubber resins, and mixtures thereof, including thermosettable rubbers; thermoplastic rubbers and elastomers including, for example, nitrile rubbers (e.g., acrylonitrile-butadiene); polyisoprene rubbers; polychloroprene rubbers; polybutadiene rubbers; butyl rubbers; ethylene-propylene-diene monomer rubbers (EPDM); polypropylene-EPDM elastomers; ethylene-propylene rubbers; styrene-butadiene copolymers; styrene-isoprene copolymers; styrene-butadiene-styrene rubbers; styrene-isoprene-styrene rubbers; styrene-ethylene-butylene-styrene rubbers; styrene-ethylene-propylene-styrene rubbers; polyisobutylene rubbers; ethylene vinyl acetate rubbers; silicone rubbers including, for example, polysiloxanes; methacrylate rubbers; polyacrylate rubbers including, for example, copolymers of isooctyl acrylate and acrylic acid; polyesters; polyether esters; polyvinyl chloride; polyvinylidene chloride; polyvinyl ethers; polyurethanes and blends; and combinations thereof, including, for example, linear, radial, star, and tapered block copolymers thereof. One latex of particular interest is polyvinylidene chloride (PVDC) due to its fire retardancy and its environmental durability. The preferred latex for use in this invention is styrene-butadiene rubber (SBR).

Any reactive latex solids content may be employed in the latex emulsion, provided that the composition of this invention is achieved. The reactive latex solids content of the emulsion may be greater than about 30 weight percent, preferably, greater than about 40 weight percent, and more preferably, greater than about 50 weight percent, based on the total weight of the emulsion. Additionally, the reactive latex solids content of the emulsion may be less than about 80 weight percent, preferably, less than about 70 weight percent, and more preferably, less than about 62 weight percent, based on the total weight of the emulsion.

It is preferred that the latex employed in the latex emulsion be stabilized. In order to achieve an acceptable stability, the latex emulsion may include a stabilizer, as discussed above. It is desirable that the stabilizer create a basic environment for the latex. Ammonia is a preferred stabilizer. Preferably, a basic ammonia solution having a pH between about 8 and about 12, preferably about 10, is used. Other caustic materials that can be used to stabilize the latex emulsion include, for example, potassium hydroxide and sodium hydroxide.

Additionally, the latex emulsion may include a surfactant. Although not wishing to be bound by theory, it is believed that the surfactant coats the latex (or "lattice") particles with the negatively charged tail facing away from the particle, such that the positively charged serum creates an environment where the particles repel each other. It is also believed that the surfactant layer forms an interfacial film with water (i.e., a hydration layer) around the particle. The raw lattices are stable only when this film is intact. Because the lattice particles are in the micron range they are further stabilized by Brownian motion. Further, because the lattice particles are negatively charged, the latex is considered anionic.

The latex emulsion is present in an amount from about 60 to about 95 weight percent of the spray latex foam. Preferably, the latex emulsion is present in an amount from about 70 to about 85 weight percent of the spray latex foam.

In addition to the latex emulsion described above, the latex system may include a thixotropic agent, especially for lower density foams (i.e., no more than about 2 pounds per cubic foot). The thixotropic agent "virtually freezes" the foam structure while the structure is curing to prevent the structure from collapsing. As used herein, the phrase "virtually freezes" is meant to indicate that the freezing of the structure is not accomplished by means of dropping the temperature to below the freezing point of water. Instead, "frozen" is meant to denote a previously fluid/viscous material that is now substantially immobilized by an internal scaffolding-like structure, which in this case is provided by the thixotropic agent. A preferred thixotropic agent is a synthetic layered silicate such as, for example, Laponite® RD synthetic clay. The Laponite® products belong to a family of synthetic, layered silicates produced by the Southern Clay Products Corporation. Other thixotropic agents may be used in the present invention, as long as the thixotropic agent "freezes" the water structure while the latex finishes coagulating and curing. Other thixotropic agents useful in the present invention include clay, fumed silica, carbon black, methocellulose, and functionalized bentonite clay. The thixotropic agent is optimally used if it is added and permitted to swell prior to the addition of any other components of the latex system. The thixotropic agent can swell and create a highly thixotropic gel at about a 2% loading. The thixotropic agent may be present in an amount up to about 15 weight percent of the spray latex foam. Preferably, the amount of thixotropic agent present is about 1 to about 10 weight percent, based on the spray latex foam.

Depending on the type of lattice particles used in the latex emulsion, the latex system may also include other optional, additional components such as, for example, foam promoters, opacifiers, accelerators, foam stabilizers, and/or blowing agents. It is to be appreciated that a material will often serve more than one of the aforementioned functions, as may be evident to one skilled in the art, even though the material may be primarily discussed only under one functional headings herein.

Optionally, one or more foam promoters may be included in the latex system. The foam promoter aids in forming a stable foam cell structure. The foam promoters may be selected from quaternary ammonium soaps and betaines, amines and proteins, carboxylate soaps such as oleates, ricinoleates, castor oil soaps and rosinates, and combinations thereof. The preferred foam promoter is a carboxylate soap. A preferred carboxylate soap is potassium oleate. The foam promoter may be used in an amount of up to about 3 weight percent of the spray latex foam, preferably from about 0.5 to about 2.5 weight percent of the spray latex foam.

One or more opacifiers may be used in the latex system to improve the thermal resistance, or insulation value (R-value). Opacifiers that may be used in the latex system include, but are not limited to, carbon, iron oxide, and graphite such as micron-sized graphite and nano-sized graphite. The opacifier may be present in the latex system in an amount up to about 10 weight percent, preferably from about 1 to about 4 weight percent, of the spray latex foam.

Optionally, one or more accelerators may also be present in the latex system of the inventive spray foam. The presence of an accelerator aids in the coagulation process. Coagulation refers to the phenomena of latex particles coming together and the polymer chains interlocking with each other. Non-limiting examples of accelerators useful in the present invention include thiozole compounds such as zinc mercaptoben-zythiazolate, polyfunctional oxime compounds such as p,p'-dibenzoylquinone dioxime, and dithiocarbamates such as zinc dimethyl dithiocarbamate and sodium dibutyl dithiocarbamate. If used, the accelerator(s) may be included in the latex system in an amount up to about 10 weight percent, preferably from about 1.5 to about 8 weight percent, of the spray latex foam.

Further, one or more foam stabilizers may be present in the latex system. Foam stabilizers tend to enhance the integrity of the foam in the shaping and setting process and may also act as foaming aids. Non-limiting examples of foam stabilizers include, for example, zinc oxide and magnesium oxide. If used, the stabilizer may be included in an amount up to about 15 weight percent, preferably between about 3 and about 10 weight percent of the spray latex foam. The preferred amount of stabilizer is that which allows the foam stabilizer to become soluble in the serum as the pH becomes acidic and to work with fatty acid soaps (i.e., foam promoters) to form a stable cell structure.

In addition, the latex system may optionally contain one or more blowing agents. Examples of blowing agents that may be used in the latex system include low boiling point hydrocarbons such as cyclopentane and n-pentane, water, hydrofluorocarbons, and inert gases such as air, carbon dioxide and nitrogen. The amount of blowing agent that may be used in the latex system may fall within the range of about 5 to about 30 weight percent of the spray latex foam. Specific examples of suitable hydrofluorocarbon blowing agents include HFC 236ca (1,1,2,2,3,3-Hexafluoropropane), HFC-236ea (1,1,1,2,3,3-hexafluoropropane), HFC-236fa (1,1,1,3,3,3-hexafluoropropane), HFC-245ca (1,1,1,2,2,3-hexafluoropropane), HFC-245ea (1,1,2,3,3-pentafluoropropane), HFC-245eb 1,1,1,2,3-pentafluoropropane), HFC-245fa (1,1,1,3,3-pentafluoropropane), HFC-356mff (1,1,1,4,4,4-hexafluorobutane), HFC-365mfc (1,1,1,3,3-pentafluorobutane), and HCFC141b (2-fluoro 3,3-chloropropane).

In addition to the latex system described in detail above, the spray latex foam of the present invention includes a gaseous coagulating component that is used to coagulate the latex. Various gaseous coagulants can be employed in the present invention. In a preferred embodiment, the gaseous coagulating component is carbon dioxide. The carbon dioxide acts as a foamant and also promotes coagulation of the spray latex foam. The presence of carbon dioxide acidifies the aqueous matrix of the latex and causes the latex particles to drop out of solution and coagulate. The presence of the carbon dioxide also eliminates the need for any hydrocarbon propellants, though they may be included as optional blowing agents. The carbon dioxide used in the present invention may be pure carbon dioxide gas or it may be derived from other sources that release carbon dioxide during a chemical reaction. Such suitable alternative sources for producing carbon dioxide include, for example, carbonates like ammonium carbonate and bicarbonates like sodium bicarbonate.

In accordance with one exemplary embodiment of the present invention, carbon dioxide is included as a gaseous coagulating agent and is brought to high pressure (e.g., about 100 to about 500 psi) so that it solubilizes in the serum (i.e., water) phase. In the inventive spray latex foam, the carbon dioxide reacts with the aqueous ammonia to produce carbamate. It is to be noted that the carbon dioxide is mixed together with the latex system to coagulate it and is not used post-application to cure the latex.

The advantages of using carbon dioxide in the inventive spray latex foam are numerous. For example, latex generally requires expensive chemicals and thermal treatment for curing. However, the carbon dioxide utilized in the spray latex foam is a low-cost, relatively safe chemical. According to at least one embodiment of the present invention, carbon dioxide is used to foam and to coagulate the latex, thereby eliminating the need for more expensive chemicals and thermal treatment. The elimination of expensive chemicals and thermal treatment reduces the manufacturing costs associated with the spray latex foam, thereby making the inventive foam more cost-effective. The fact that carbon dioxide is generally recovered from power generation or manufacturing processes makes it a more readily available resource.

The carbon dioxide can act quickly in the latex foam because it does not encounter frozen water, unlike the Talalay process. In the inventive spray latex foam, the carbon dioxide diffuses into the water under some pressure and forms carbonic acid, which reacts quickly with the ammonia to form carbamate. It is believed that the carbamate acts as a cross linking agent and as an accelerator to cure the foam and produce the final foam product. The carbonic acid will also shift the pH of the water in the latex down to the acidic region. This shift in the pH will destabilize the latex particles and causes them to coagulate (e.g., move together and coalesce). Under zero shear, the water in the foam will virtually freeze via the thixotropic agent. This "freezing" will reduce the occurrence of, or even prevent, the drainage and collapse behaviors in the foam.

In a preferred embodiment, a combination of carbon dioxide and compressed air is used for coagulating and blowing the foam. One advantage of mixing the carbon dioxide with compressed air is safety, because 100% carbon dioxide could create dangerous working conditions for the person or persons applying the inventive spray foam. Additionally, the level of carbon dioxide in the room where the spray latex foam is applied may rise quickly with 100% carbon dioxide in the spray latex foam. On the other hand, if both carbon dioxide and compressed air are used, the carbon dioxide may be introduced into the air stream in the air in the mixing apparatus, or to the foam itself, in the mixing apparatus. Preferably, the carbon dioxide is mixed with compressed air in the mixer to create a foam.

According to at least one exemplary embodiment of the present invention, the actual foaming of the latex system can be accomplished with a mixing apparatus such as, for example, a continuous mixer. The gaseous coagulant and the latex system may be pumped into the mixing head of the mixer. One advantage of utilizing a continuous mixer is that it mixes intensively without generating a large amount of heat, which can cause the latex to coagulate prematurely. In addition, a second mixing apparatus such as, for example, a static mixer, may be placed at the exit of the continuous mixer. Surrounding the second mixer may be a porous cylinder and a solid cylindrical shell that allows for the uniform introduction of the gaseous coagulating component. Alternatively, the gaseous coagulating component may be introduced directly into the continuous mixer. An example of a mixer useful in the present invention is an Oakes-type continuous mixer.

In addition to the latex system and the gaseous coagulating component, other ingredients that may be included in the spray latex foam of the present invention include dyes, color indicators, gelling agents, foam stabilizers and promoters, accelerators, blowing agents. As previously noted, a material may often serve more than one of the aforementioned functions, as may be evident to one skilled in the art, even though the material may be primarily discussed only under one functional heading herein below.

Optionally, dyes may also be used to change the color of the foam. A red/pink color for the foam is preferred. Color indicators may be employed to provide visual confirmation that the foam is dry after being applied.

Additionally, one or more foam stabilizers may be optionally included in the latex system of the spray latex foam. The foam stabilizers enhance the integrity of the foam in the shaping and setting process and may also act as a foaming aid. Non-limiting examples of foam stabilizers that may be used in the spray latex foam include those mentioned above, namely, zinc oxide and magnesium oxide, as well as diphenyl guanidine and ammonium chloride. If used, the stabilizer will be included in an amount up to about 10 weight percent of the spray latex foam, depending on the type(s) of foam stabilizer present, and preferably from about 0.5 to about 6 weight percent of the spray latex foam.

Optionally, one ore more gelling agents may be included in the spray latex foam to facilitate the gelling of the semi-liquid viscous foam and form a solid cellular structure upon coagulation. Gelation of the foam may result from the hydrolysis of relatively insoluble acid-forming chemicals such as the ammonium, sodium, or potassium salts of silicofluorides. Gelation of the foam can also result from the decomposition of suitable heat-sensitive ammonium salts such as ammonium sulfates, nitrates, chlorides, thiocyanates, formates, and acetates. The incorporation of a gelling agent or agents may be accomplished after compounding and frothing the liquid foam. Typically, the gellants are carefully metered into the froth after foaming, but before drawing the froth into the desired shape. If used, the quantity of gelling agent(s) employed may be selected based upon the gelling capacity of the selected gelling agent(s), as well as the type of latex particles used. The gelling agents may be included in an amount up to about 15 weight percent based on the spray latex foam and, preferably from about 5 to about 13 weight percent. It should be noted that unlike the carbon dioxide that will shift the pH of the serum and not only effect coagulation but also crosslink the latex, the gelling agent does not vulcanize the latex.

One or more accelerators may also be included in the spray latex foam of the present invention. Non-limiting examples of accelerators useful in the present invention include those mentioned above, as well as organic phenols. If used, the accelerator(s) may be included in an amount up to about 10 weight percent, preferably from about 0.5 to about 5 weight percent, of the spray latex foam.

Optionally, the spray latex foam of the present invention may include one or more additional foaming stabilizers. Foaming stabilizers encourage the formation of foams and include materials such as conventional surfactants. Useful surfactants include cationic, anionic, amphoteric and non-ionic surfactants such as, for example, the previously mentioned carboxylate soaps, quaternary ammonium soaps and betaines, amines and proteins, oleates, ricinoleates, castor oil soaps and rosinates, as well as alkyl sulphates. If used, the foaming stabilizers will be included in an amount up to about 5 weight percent of the spray latex foam, preferably from about 0.25 to about 3 weight percent, depending on the type(s) of foaming stabilizers present.

Blowing agents may also be included in the spray latex foam of the present invention. Suitable blowing agents that may be present in the spray latex foam include those mentioned above as suitable for use in the latex system, namely hydrocarbons, water, hydrofluorocarbons, and inert gases. In addition, hydrogen peroxide may also be used as a blowing agent in the spray latex foam of the present invention.

These optional components may or may not be encapsulated in a polymer or wax shell dispersed within the latex system. One example of a suitable encapsulation method is described in U.S. Patent Application Publication No. 2006/0047010 entitled "Pseudo One Part Foam" to Owens Corning, the content of which is incorporated by reference herein in its entirety. Preferably, the additional or optional components are encapsulated so as not to effect the coagulation of the latex until such time that the spray latex foam is used.

In the present invention, the spray latex foam desirably has a low density. In particular, the density of the foam should be between about 0.5 and about 2 pounds per cubic foot. A density of about 0.5 pound per cubic foot is preferred. Lower densities are preferred in order to produce a latex foam that has a high thermal resistivity and a low air permeability, both of which are desired properties of an insulation material. Although a low density foam is desirable, the process of the present invention may be used to produce a foam of any density. The density of the foam will increase by metering less compressed air into the mixing apparatus. Therefore, in yet another exemplary embodiment of the present invention, the foam may have a high density (i.e., above about 2 pounds per cubic foot) and be used only as an air barrier and not as an insulation material.

According to one embodiment, the spray latex foam of the present invention contains two separate components (i.e., the latex system and the gaseous coagulant), similar to conventional two-part spray polyurethane foams ("A" and "B" sides). The inventive two-part spray latex foam is installed using the current spray equipment designed for conventional two-part spray polyurethane foams.

According to another exemplary embodiment, the spray latex foam of the present invention is a "one-part" variation. More specifically, the spray latex foam may be a spray foam system that encapsulates one or more reactants in a polymer or wax shell, which is dispersed within the latex system. This encapsulation allows the reactants to be mixed in one container without significant reaction. When this mixture/suspension is processed through an application gun, the one or more encapsulated reactants are substantially released such as by heating or shearing and mixed with the latex system. The ratios of the latex constituents may range from 1:1 to a much higher ratio, such as, for example 1:20, which lends itself to the encapsulation concept of the minor constituent in a wax/polymer shell that is then suspended in the major constituent (i.e., the latex system).

The "one-part" spray latex foam of the present invention requires no expensive or complicated spraying equipment such as the type that is required for conventional, two-part spray polyurethane foams. The spraying equipment for the "one-part" spray latex foam may be simple guns such as, for example, a simple diaphragm or drum pump. These types of guns are less likely to clog and are also much easier to maintain and clean.

According to yet another embodiment of the present invention, a third chemical reactant may also be encapsulated. For example, to keep the process of the present invention simple, it may be advantageous to encapsulate certain ingredients like sodium silicofluoride and/or zinc oxide such that they are activated by the spraying process. These components may be encapsulated in a wax shell that is melted during the spray process or a shell that fractures under the shear action of foaming.

In accordance with the present invention, the inventive spray latex foam may be made by first supplying a latex system, which preferably includes a latex emulsion and a thixotropic agent. To the latex system is added a gaseous coagulating component to form a spray latex foam. To achieve the desired, lower foam densities, air may also be used to blow the foam. Thus, air is injected/entrained to the latex system to decrease the density, followed by injection of the gaseous coagulating component to add more gas to the latex system and coagulate the structure.

In use, the inventive spray latex foam may be sprayed into either an open cavity, such as between wall studs, or into a closed cavity where it expands to seal any open spaces. The application is desirably a continuous spray process.

The spray-in latex foam of the present invention may be used to insulate buildings such as homes from temperature fluctuations outside of the building's envelope. The spray latex foam may serve both as a conductive and a convective thermal barrier. The spray latex foam of the present invention may also serve as a sealant to air infiltration by filling cracks and/or crevices in a building's roof or walls.

The spray latex foam of the present invention is preferably a non-structural foam. The soft foam nature of the latex allows for easy compaction. As such, the inventive spray latex foam has several benefits. For example, there is no post-application waste to an open wall cavity. If there is an over-filling of the cavity, the drywall would simply compress the foam back into the cavity. The inventive foam is giving, so it will not apply a significant pressure to the drywall and little or no bowing or detachment of the drywall will occur.

One advantage of the spray latex foam of the present invention is the safe installation of the foam into wall cavities. The spray latex foam does not release any harmful vapors into the air when applied or sprayed. Therefore, the inventive spray latex foam reduces the threat of harm to individuals working with or located near the foam. In addition, the application of the spray latex foam is more amenable to the installer as he/she will not need to wear a special breathing apparatus during installation.

Another advantage of the inventive foam is that it can be used in the renovation market, as well as in houses that are occupied by persons or animals. Existing, conventional spray polyurethane foams cannot be used in these applications because of the generation of high amounts of free isocyanate monomers that could adversely affect the occupants of the dwelling. As discussed above, exposure of isocyanate monomers may cause irritation to the nose, throat, and lungs, difficulty in breathing, skin irritation and/or blistering, and a sensitization of the airways.

Yet another advantage of the present invention is that the components of the spray latex foam may be mixed and stored in one container without significant reaction until such time that the spray latex foam is used. This simplifies application of the spray foam because no other components are being added at the point of application. Instead, the encapsulated components are activated at the point of application.

Having generally described this invention, a further understanding can be obtained by reference to certain specific examples illustrated below which are provided for purposes of illustration only and are not intended to be all inclusive or limiting unless otherwise specified.

EXAMPLES

Prophetic examples of the spray latex foam composition according to the present invention are set forth below in Examples 1-3. These Examples illustrate different lattice particles that may be used in the inventive latex system. In each of Examples 1-3, Part A refers to the latex system, while Part C refers to the gaseous component used for blowing and coagulating the foam. Part B refers to secondary additives that may or may not be encapsulated. The Part B components can be encapsulated in either a heat or shear sensitive encapsulant such as a low melting paraffin wax or acrylic. Part B can then be added to Part A under low shear mixing in the Part A container. The two components (A and B) may then be pumped with a metered amount of air into mixing apparatus, such as a high shear, dynamic mixer or foaming head. Close to the exit of the foaming head or, alternatively, at a spray nozzle assembly (after the foaming head) carbon dioxide is metered into the foam. The entire system is under about 50-80 pounds per square inch of pressure such that the carbon dioxide will dissolve in the aqueous phase of the latex. A static mixer may be attached to the end of the foam head or at the spray nozzle to help the carbon dioxide mix with the foam.

If the Part B components are not encapsulated, then they may be metered into the foam either after the foam head (before the static mixer) or at the spray nozzle (before the static mixer). The coagulation process can take several hours to complete depending on how fast the water is able to diffuse out of the foam structure. Optionally, the foam structure can be subjected to a curing process after complete coagulation. A curing process generally requires a prolonged heating step in an oven to allow the polymer to vulcanize (cross-link). The curing step imparts additional resiliency and strength to the foam that may be necessary for certain applications such as seat cushions or bedding.

Example 1

Styrene Butadiene Latex Foam Composition

TABLE 1

| Item | Part | Component | Weight Percent |
|---|---|---|---|
| 1 | A | 30/70 Styrene Butadiene Copolymer (65%) latex | 78.4 |
| 2 | A | Potassium Oleate (20%) soap | 1.3 |
| 3 | A | Laponite ® RD thixotropic clay | 3 |

TABLE 1-continued

| Item | Part | Component | Weight Percent |
|---|---|---|---|
| 4 | A | Ammonia | 0.3 |
| 5 | A | Nano-sized graphite | 2 |
| 6 | A | Zinc Oxide (50%) | 5.0 |
| 7 | B | Sodium Silicofluoride (20%) | 6.4 |
| 8 | C | Carbon Dioxide | 3.6 |
| 9 | C | Air | As required for density |

In this Example, the latex system includes an SBR latex emulsion. Typically, the ammonia is already part of the latex emulsion; however, it is shown as a separate component in this Example. As previously discussed, the ammonia is used to adjust the pH of the latex to create a stable colloid. In addition to the SBR latex emulsion, the latex system in this Example also includes a thixotropic agent. It is to be appreciated that although Laponite® RD thixotropic clay is used in this Example, other Laponite® clay products could be used in this Example provided that the clay "freezes" the water structure while the carbon dioxide finishes coagulating the latex. The latex system also includes potassium oleate as a foam promoter, nano-sized graphite as an opacifier, and zinc oxide as a foam stabilizer. Carbon dioxide is used as the gaseous coagulant, and air is used as a blowing agent.

Example 2

Polychloroprene Latex Foam Composition

TABLE 2

| Item | Part | Component | Weight Percent |
|---|---|---|---|
| 1 | A | Polychloroprene (59%) latex | 75.8 |
| 2 | A | Zinc Oxide (50%) | 6.7 |
| 3 | A | Laponite ® XLG thixotropic clay | 4.5 |
| 4 | A | Ammonia | 0.67 |
| 5 | A | P,p'-dibenzoylquinone dioxime (50%) | 1.8 |
| 6 | A | Sodium dibutyl dithiocarbamate (25%) | 1.8 |
| 7 | B | Catechol (50%) | 0.89 |
| 8 | B | Foam stabilizer (15%) | 0.3 |
| 9 | B | Sodium Silicofluoride (20%) | 4.5 |
| 10 | C | Carbon Dioxide | 3.0 |
| 11 | C | Air | As required for density |

In this Example, the latex emulsion includes a polychloroprene latex. In addition to the latex emulsion, the latex system in this Example includes a thixotropic agent. The latex system also includes zinc oxide as a foam stabilizer, and p,p'-dibenzoylquinone and sodium dibutyl dithiocarbamate as accelerators for the coagulating process. Catechol functions as a gel sensitizer and as an accelerator. The foam stabilizer may contain C-cetyl betaine with a wetting agent and sodium alkyl sulphate. The gaseous coagulant of carbon dioxide and air is metered into the mixing head. All of the B components may be encapsulated either individually or together.

Example 3

Natural Rubber Latex Foam Composition

TABLE 3

| Item | Part | Component | Weight Percent |
|---|---|---|---|
| 1 | A | Natural Rubber (60% ammonia preserved) | 83 |
| 2 | A | Potassium Oleate (20%) Soap | 1 |
| 3 | A | Laponite ® RDS thixotropic clay | 1 |
| 4 | A | Nano-sized graphite | 2 |
| 5 | A | Zinc diethyl dithiocarbamate (50%) | 1 |
| 6 | A | Zinc mercaptobenzythiazolate (50%) | 0.75 |
| 9 | B | Zinc Oxide (50%) | 2.9 |
| 10 | B | Sodium Silicofluoride (20%) | 2.5 |
| 11 | B | Diphenyl Guanidine (50%) | 0.3 |
| 12 | B | Ammonium Chloride (20%) | 0.5 |
| 11 | C | Carbon Dioxide | 5 |
| 12 | C | Air | As required for density |

In this Example, the latex system includes a natural rubber latex emulsion. The latex system also includes Laponite® RDS thixotropic clay as a thixotropic agent. Additional components of the latex system are an opacifier (nano-sized graphite), a foam promoter (potassium oleate), and accelerators. In this Example, the diphenyl guanidine and ammonium chloride act as foam stabilizers. All of the B components may or may not be encapsulated.

Example 4

Natural Rubber and SBR Latex Foam Composition

Latex stress strain samples were made in accordance with the present invention. The latex emulsion includes a mixture of natural latex and SBR. A one-eighth (⅛) inch thick layer of the latex (a mixture of natural latex and SBR), stabilized with ammonia, was poured into a three (3) inch diameter aluminum pan. The pan was then placed in the bottom of a pressure vessel and the vessel was sealed. About 150 psi of carbon dioxide was then introduced into the vessel and allowed to interact with the latex emulsion for about five (5) minutes at ambient temperature. A second set of latex stress strain samples was made in the same manner, except that the temperature was raised to 50° C. before the introduction of the carbon dioxide. The vessel was then outgassed and opened, and the sample was removed. The thick latex film was then pulled from the aluminum pan and padded dry with a paper towel. It was allowed to sit in the ambient atmosphere and continue drying for four (4) days. From these samples were cut strips measuring approximately one inch by one inch. These strips were used to measure the load versus elongation (or stress versus strain) using an Instron® machine.

Figure 1:
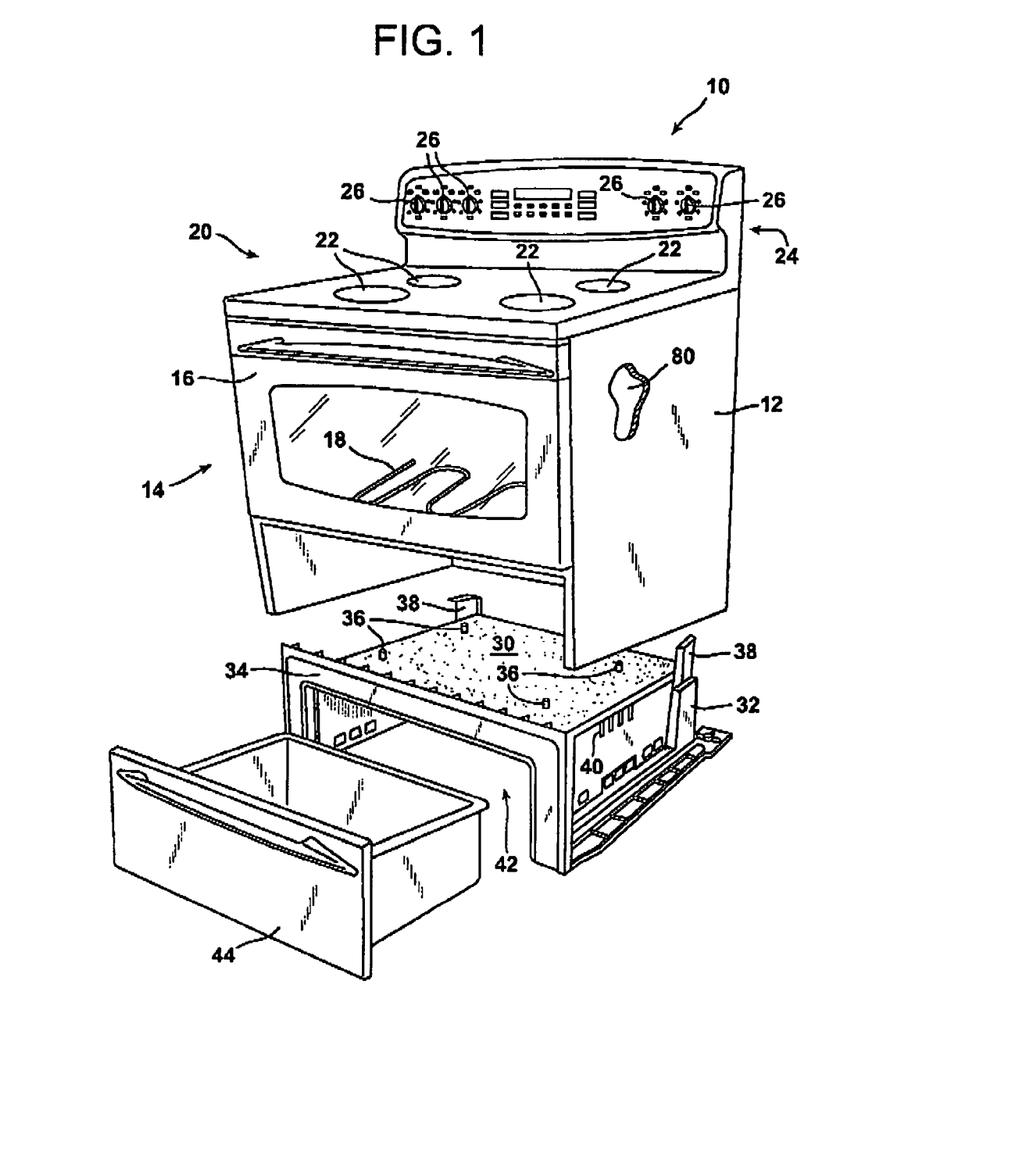
FIG. 1 is a graphical illustration depicting the results of stress versus strain tests performed on inventive carbon dioxide cured SBR latex samples.
Figure 2:
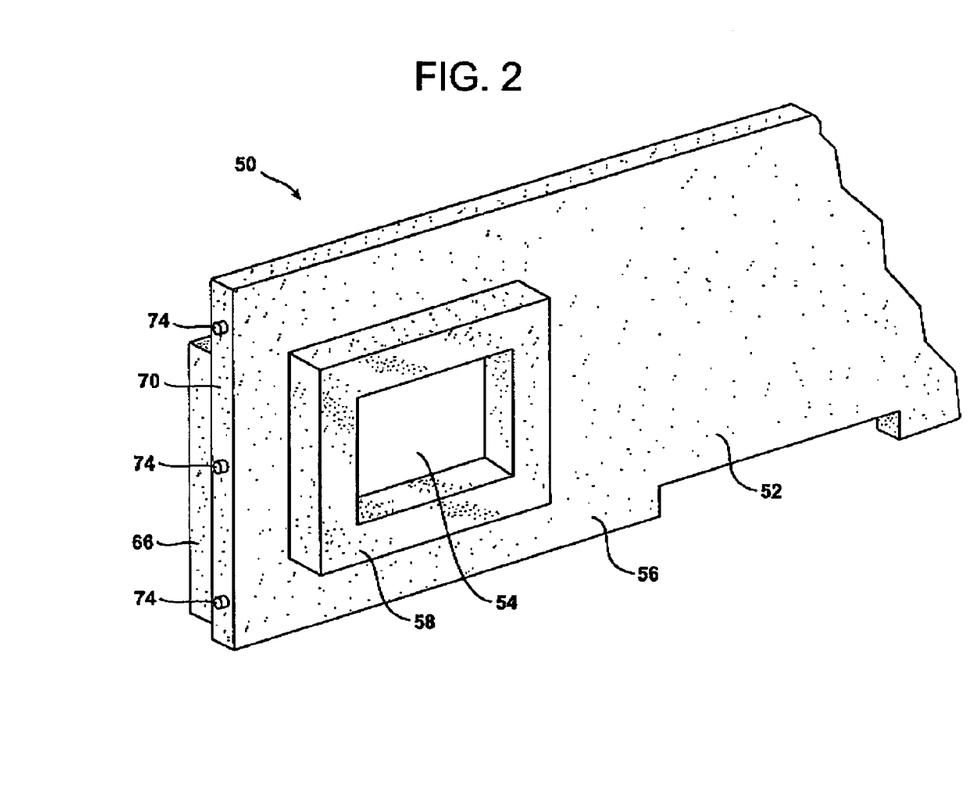
Figure 3:
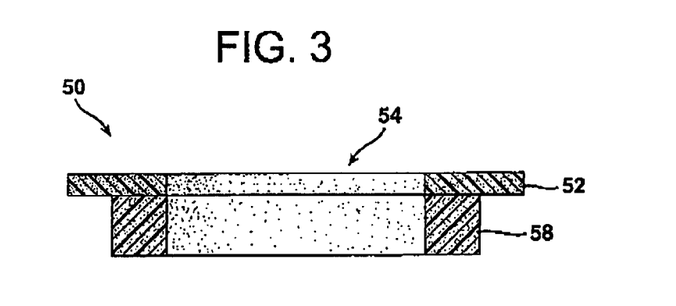
Figure 4:
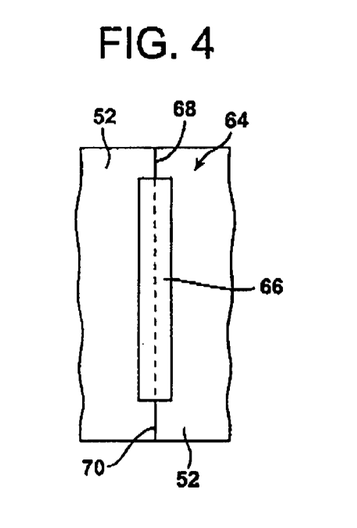
Figure 5:
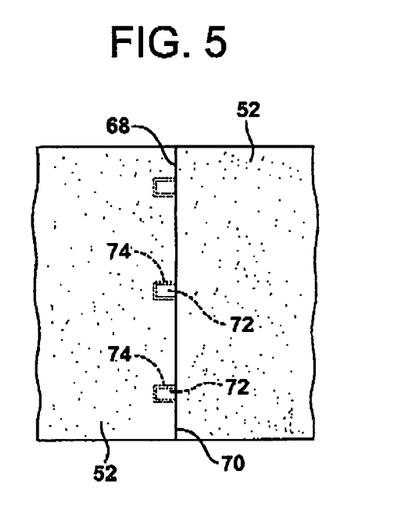
Figure 6:
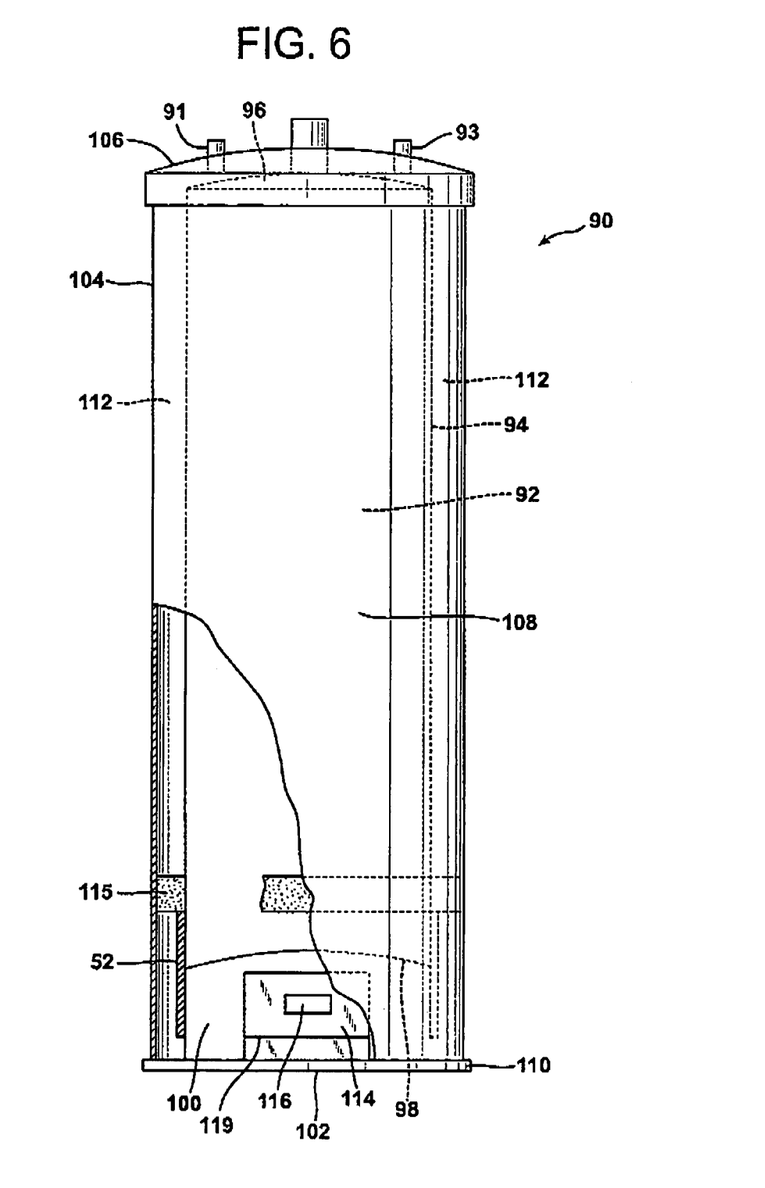

FIG. 1 illustrates the results of the stress versus strain tests performed on the inventive carbon dioxide cured SBR latex samples made as described in Example 4. FIG. 1 shows the increasing stress with strain that is indicative of a cross-linked material. FIG. 1 further shows that applying heat to the mixture with the carbon dioxide appears to increase the strength. Equivalent air-dried latex samples of the same age could not be tested because the equivalent air-dried samples had no integrity (i.e., they fell apart upon handling). The inventive samples, on the other hand, did not break during the test. Instead, when the inventive samples were released from the jaws of the Instron® machine, the samples snapped back to about twice the original length. These results indicated that the inventive spray latex foam samples are a cohesive, elastomeric material and have the properties needed for application as a sealing/insulating material for filling cavities. Moreover, the fact that the samples did not fall apart indicated that that inventive spray latex foam coagulated properly. Otherwise, the samples would have fallen apart.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of preparing a two-part spray latex foam, said method comprising:
   supplying a first component including a latex system, including a latex and a thixotropic agent from a first line; and
   supplying a second component from a second line to mix with said first component to form a spray latex foam, said second component including a gaseous coagulating component including carbon dioxide.

2. The method according to claim 1, further comprising adding at least one member selected from the group consisting of dyes, color indicators, gelling agents, foam stabilizers, foam promoters, blowing agent, and accelerators to said latex system.

3. The method according to claim 2, wherein one or more of said dyes, color indicators, gelling agents, foam stabilizers, foam promoters, blowing agents, and accelerators is encapsulated and dispersed in said latex system.

4. The method according to claim 1, wherein said latex is selected from natural rubbers, synthetic rubbers and mixtures thereof.

5. The method according to claim 4, wherein said latex is styrene-butadiene rubber.

6. The method according to claim 1, wherein said thixotropic agent is selected from clay, fumed silica, carbon black, methocellulose, functionalized bentonite and synthetic, layered silicate.

7. A method of filling wall cavities comprising:
   spraying into said cavities a two-part spray latex foam, said spraying step including:
   supplying a first component including a latex system through a first line, said latex system including a latex and a thixotropic agent; and
   supplying a second component including carbon dioxide as a gaseous coagulating component through a second line; and
   mixing said first and second components to form said spray foam.

8. The method of claim 7, wherein said latex system includes a latex selected from natural rubbers, synthetic rubbers and mixtures thereof.

9. The method according to claim 1, wherein said gaseous coagulating component further includes compressed air.

10. The method according to claim 7, wherein said gaseous coagulating component further includes compressed air.

11. The method according to claim 1, wherein said carbon dioxide foams and coagulates said latex.

12. The method according to claim 7, wherein said carbon dioxide foams and coagulates said latex.

13. A latex system for forming a spray latex foam, comprising:
   an application gun;
   a first component including a latex and a thixotropic agent, and a first delivery line for delivery of the first component to a building via the application gun; and
   a second component including a gaseous coagulating component including carbon dioxide, and a second line for delivery of the second component to the building via the application gun,
   wherein the application gun mixes the first and second components from the first and second lines and applies the mixture to the building; and wherein, upon mixing the first and second components in the application gun, said carbon dioxide begins to foam and coagulate the latex.

14. The latex system of claim 13, wherein said latex is selected from natural rubbers, synthetic rubbers and mixtures thereof.

15. The latex system of claim 14, wherein said latex is styrene-butadiene rubber (SBR).

16. The latex system of claim 13, wherein said thixotropic agent is selected from clay, fumed silica, carbon black, methocellulose, functionalized bentonite and synthetic, layered silicate.

17. The latex system of claim 16, wherein said thixotropic agent is synthetic, layered silicate.

18. The latex system of claim 13, wherein said first component further includes at least one member selected from foam promoters, opacifiers, accelerators, blowing agents and foam stabilizers.

* * * * *